US006598140B1

(12) United States Patent
McAllister et al.

(10) Patent No.: US 6,598,140 B1
(45) Date of Patent: Jul. 22, 2003

(54) MEMORY CONTROLLER HAVING SEPARATE AGENTS THAT PROCESS MEMORY TRANSACTIONS IN PARALLEL

(75) Inventors: Curtis R. McAllister, Sunnyvale, CA (US); Robert C. Douglas, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,927

(22) Filed: Apr. 30, 2000

(51) Int. Cl.[7] .............................................. G06F 12/08
(52) U.S. Cl. ...................... 711/168; 711/141; 711/154; 711/152; 709/102; 710/107; 710/39
(58) Field of Search .................................. 711/141, 144, 711/151, 145, 156, 120, 121, 168, 153, 152; 710/5, 39, 22–24, 107, 263, 205; 370/412, 383; 707/100; 709/102, 104, 105, 205

(56) References Cited

U.S. PATENT DOCUMENTS

| | | | | |
|---|---|---|---|---|
| 4,768,149 | A | * | 8/1988 | Konopik et al. ............ 710/269 |
| 5,404,483 | A | * | 4/1995 | Stamm et al. .............. 711/144 |
| 5,644,754 | A | * | 7/1997 | Weber et al. ............... 710/112 |
| 5,838,915 | A | * | 11/1998 | Klausmeier et al. ........ 370/412 |
| 5,893,162 | A | * | 4/1999 | Lau et al. ................... 707/100 |
| 5,915,095 | A | * | 6/1999 | Miskowiec .................. 709/223 |
| 5,995,967 | A | * | 11/1999 | Iacobovici et al. ............ 707/1 |
| 6,185,601 | B1 | * | 2/2001 | Wolff ......................... 709/203 |
| 6,295,534 | B1 | * | 9/2001 | Mann ......................... 711/147 |
| 6,332,180 | B1 | * | 12/2001 | Kauffman et al. .......... 711/153 |
| 6,438,652 | B1 | * | 8/2002 | Jordan et al. ............... 711/120 |

FOREIGN PATENT DOCUMENTS

EP   0 107 191 A2  *  5/1984  ......... G05B/19/417

OTHER PUBLICATIONS

"Coordination of Multiple Intelligent Bus Units By A Common Controller", IBM Technical Disclosure, vol. 34, No. 5, pp. 436–438, Oct. 1991.*
Herlihy et al., "Transactional Memory, Architectural Support for Lock–Free Data Structures", ACM Special Interest Group on Computer Architecture, pp. 289–300, 1993.*
"Priority Queue Controller Using Linked–List Techniques", IBM Technical Disclosure Bulletin, vol. 31, pp. 41–45, 1988.*

* cited by examiner

Primary Examiner—Pierre-Michel Bataille
(74) Attorney, Agent, or Firm—David A. Plettner

(57) ABSTRACT

A memory controller has separate memory controller agents that process memory transactions in parallel. A memory controller in accordance with the present invention includes a plurality of memory controller agents, which are coupled to each other via a series of busses, an incoming memory transaction dispatch unit, and an outgoing memory dispatch unit. Memory transactions are received from cacheable entities of a computer system at the incoming memory transaction dispatch unit, and are then presented to the plurality of agents. For each incoming transaction, one of the agents will accept the transaction. Each agent is responsible for ensuring coherency and fulfilling memory transactions for a single memory line. If multiple memory read transactions are received for a single memory line, the agents will configure themselves into a linked list to queue up the requests. The coherency information and memory line data associated with each memory line may be cached by each agent, thereby allowing repeated requests to the same memory line to be serviced more quickly. When two or more agents are queued up to fulfill multiple memory read transactions to the same memory line, the agents cooperate by transferring the coherency information and memory line data associated with each memory line from agent to agent, thereby minimizing the need to access main memory. The agents complete memory transactions back to the cacheable entities via the outgoing memory dispatch unit.

12 Claims, 12 Drawing Sheets

MEMORY CONTROLLER HAVING SEPARATE AGENTS THAT PROCESS MEMORY TRANSACTIONS IN PARALLEL

CROSS REFERENCE TO RELATED APPLICATION

This application contains subject matter related to an application entitled "A Memory Controller That Provides Memory Line Caching and Memory Transaction Coherency by Using at Least One Memory Controller Agent" by Curtis R. McAllister et al., U.S. patent application Ser. No. 09/560, 929, and an application entitled "A Hardware-Based Linked List" by Curtis R. McAllister et al., U.S. patent application Ser. No. 09/560,928. Both of these applications are hereby incorporated by reference, are assigned to the same assignee as the present application, and were filed on Apr. 30, 2000, which is also the date on which the present application was filed.

FIELD OF THE INVENTION

The present invention relates to memory controllers in computer systems. More specifically, the present invention relates to a system memory controller having a plurality of memory controller agents, wherein each memory controller agent contains a coherency controller and a memory controller capable of processing memory transactions for a single memory line.

DESCRIPTION OF THE RELATED ART

In early computer systems, memory controllers were relatively simple. Typically, a single processor of the computer system would issue a read or write transaction to a memory controller, and the memory controller would complete the transaction to main memory by performing the specified read or write operation. However, as the art of computer design has progressed, memory controllers have become significantly more complex. Processors typically include multiple levels of cache memories, with each cache memory storing a subset of the contents of main memory. Furthermore, many modern computer systems often have multiple processors and I/O units, with each processor and I/O unit have one or more cache memories and requiring access to main memory. A modern memory controller must be able to efficiently handle memory transactions from each processor and I/O unit, while keeping all cache memories coherent and arbitrating between separate memory transactions to the same memory line.

To better understand the challenges facing designers of modern memory controllers, first consider a cache memory. A cache memory is a small, high-speed buffer memory which is used to hold temporarily those portions of the contents of main memory which it is believed will be used in the near future by a processor or I/O unit. The main purpose of a cache memory is to shorten the time necessary to perform memory accesses, either for data or instruction fetches from memory or writes to memory. The information located in a cache memory may be accessed in much less time than information located in main memory. Thus, a processor or I/O unit with a cache memory needs to spend far less time waiting for instructions and operands to be fetched or stored.

A cache memory is made up of many cache lines of one or more words of data. Each cache line has associated with it an address tag that uniquely identifies the memory line of main memory of which the cache line is a copy. Each time the processor or I/O unit makes a memory reference, an address tag comparison is made to see if a copy of the requested data resides in the cache memory. If the desired memory line is not in the cache memory, the memory line is retrieved from main memory, stored in the cache memory as a cache line, and supplied to the processor or I/O unit.

In addition to using a cache memory to retrieve data from main memory, the processor or I/O unit may also write data into the cache memory, thereby delaying (or, in the case of successive writes to the cache memory, even possibly eliminating) the need to write the data to main memory. When the processor or I/O unit desires to write data to memory, the cache memory makes an address tag comparison to see if the memory line into which data is to be written resides in the cache memory. If the memory line exists in the cache memory and is being held as "exclusive" or "private", the data is written into the cache line in the cache memory that is holding the memory line. In many systems a data "dirty bit" for the cache line is then set. The dirty bit indicates that data in the cache line is dirty (i.e., has been modified), and thus before the memory line is deleted from the cache memory the modified data must be written back to main memory. If the memory line into which data is to be written does not exist in the cache memory or is held as "shared", the memory line must be fetched as "private" or "exclusive" into the cache memory, or the data must be written directly into the main memory.

A shared-memory multi-processor (MP) system has a potentially large number of processors and I/O units, with each processor and I/O unit having one or more cache memories. For simplicity, any processor, I/O unit, or other subsystem having one or more cache memories will be referred to herein as a cacheable entity.

When an access to memory is made in such an MP system, it is necessary to take steps to ensure the integrity of data accessed. For example, when a cacheable entity reads data from memory, it is important to determine whether an updated version of the data resides in the cache of another cacheable entity. If an updated version of the data exists, something must be done to ensure that the entity accesses the updated version of the data, and not the stale version currently stored in main memory. A mechanism that ensures that the updated version of the data is utilized in a memory reference is referred to herein as a cache coherency mechanism.

The most common cache coherency mechanism is typically referred to as a snoop mechanism. A snoop mechanism usually requires the cacheable entities to share a bus such that each cacheable entity can "snoop" the memory transactions of the other cacheable entities. However, due to electrical reasons and bandwidth concerns, only a limited number of cacheable entities can share a bus in a manner that allows transactions to be snooped. Therefore, when the number of cacheable entities in an MP system is large, snooping can no longer be effectively used for cache coherency.

The most common cache coherency mechanism for systems with a large number of cacheable entities is a directory-based cache coherency mechanism. A directory-based cache coherency mechanism typically includes a directory structure in main memory. Within the directory structure, line state information exists for each memory line within the main memory. The line state information consists of a number of bits associated with each memory line. The bits for each memory line indicate, for that memory line, the state of the memory line, such as "private" or "shared", the cacheable entities, if any, that are currently holding copies of the memory line, and any other information relevant to that memory line.

When the memory line is held as "private" in a cache memory of a first cacheable entity, the memory line is not available for use by other cacheable entities until released by the first cacheable entity, and the first cacheable entity is allowed to modify the contents of that memory line. When the memory line is held as "shared" in the cache memories of one or more cacheable entities, the memory line is available for use by other cacheable entities as long as the other entities do not want to hold the memory line as "private". While the line is held "shared", the contents of the line are not allowed to be modified.

When a cacheable entity desires to access a memory line, a request is sent to the memory controller. The memory controller reads the line state information for the memory line to determine the current state of the requested memory line. If the line state information bits for the requested memory line indicate that the memory line is held as private in a cache of another cacheable entity, the memory line is recalled to the memory controller. Note that if the memory line is "dirty", the modified contents of the memory line must also be recalled and then provided to the requesting cacheable entity. When the memory line comes back to the memory controller, the memory controller supplies the memory line to the requester, updates the memory line's line state information and, updates the data for the memory line in main memory if the memory line was dirty.

If the memory line is requested as private and the memory controller reads the line state information and finds the memory line is shared, the memory controller invalidates copies of the memory line in the cache memories of other cacheable entities (as indicated by the line state information) and then supplies the memory line to the requesting cacheable entity. The memory controller also tags the line state information of the memory line as private and updates the line state information to identify the cacheable entity that now owns the memory line as private.

The memory line recall/invalidate operation can take a significant amount of time. Meanwhile, new requests for the same memory line can be received by the memory controller. Retrying these new requests is complicated in large MP systems because of the need to provide fairness and prevent starvation.

One possible mechanism for providing fairness and preventing starvation is to queue new requests for a particular memory line in the form of a linked list. Once the recalled data or the invalidate acknowledgment is received, the memory controller services the requests for that memory line in the linked list in the order the requests were received. Multiple linked lists for currently active memory lines can exist simultaneously in the memory controller. Such a mechanism was described by Sorin Iacobovici et al. in U.S. Pat. No. 5,995,967, which is entitled "Forming Linked Lists Using Content Addressable Memory", is assigned to the same assignee as the present application, and is hereby incorporated by reference as if completely set forth herein.

Large MP computer systems often use a relatively loose ordering model when processing read and write transactions to the same memory line. Operations that require a strict ordering model, such as semaphore operations, are generally performed by obtaining private ownership of a memory line and not releasing ownership of the memory line until the operations have been performed upon the memory line contents in the desired order. Another approach is to export an instruction used to access a semaphore, such as a fetch and add instruction, to be executed at a central location, such as a memory controller.

Because the ordering of read and writes at the memory controller is relatively loose, read and write transactions may be processed in any order. As discussed above, requests to gain access to a memory line may be processed in a "first-in first-out" order to provide fairness and to prevent starvation, though this is not required. Furthermore, write operations should be processed before read operations to ensure that the read operations receive the most up-to-date data. For example, if a processor is continuously to polling a memory location to see if a flag is set, and a write operation setting the flag arrives after read operation reading the flag, it is desirable to provide the results of the write operation to the read operation. Doing so will eliminate the need to issue another read operation to poll the flag.

Similarly, the most recent write operation received for a particular memory line should invalidate any previously received write operations because the most recent write operation presumably has the currently valid copy of the contents of the memory line. Accordingly, read and write operations are preferably processed with the following ordering semantics: read operations for a particular memory line are queued up for processing in the order received, and any write operation to a memory line is processed before all read operations from the memory line, and the last write operation to a memory line invalidates any previously received write operations to the memory line.

While the above ordering semantics may be stated quite simply, they are, in fact, relatively difficult to implement. Consider that a modern memory controller can process transactions for many memory lines simultaneously, and these transactions can all be in various states of completion. One prior art method of providing the above ordering semantics is to compare each incoming read transaction to all pending write transactions. If a read transaction attempts to access the same memory line as a pending write transaction, the read transaction is stalled until the write transaction is complete. While this method provides proper ordering, it is somewhat inefficient because read operations that could be completed in theory are stalled.

Another prior art method also compares each incoming read transaction to all pending write transactions. However, if a read transaction attempts to access the same memory line as a pending write transaction, the read transaction is completed out-of-order by using the memory line contents provided in the write transactions.

Note that prior art approaches tend to view the control of coherency and the scheduling memory transactions as a centralized problem. As MP systems continue to increase in complexity, memory controllers have tended to become unduly complex, thereby lengthening the time and expense required to design, verify, and debug a particular controller design, and thereby lengthening the time-to-market.

SUMMARY OF THE INVENTION

The present invention is a memory controller having separate memory controller agents that process memory transactions in parallel. A memory controller in accordance with the present invention includes a plurality of memory controller agents, which are coupled to each other via a series of busses, an incoming memory transaction dispatch unit, and an outgoing memory dispatch unit.

Memory transactions are received from cacheable entities of a computer system at the incoming memory transaction dispatch unit via an interconnection fabric. The incoming transactions are then presented to the plurality of memory controller agents. For each incoming transaction, one of the agents will accept the transaction. Each agent is responsible for ensuring coherency and fulfilling memory transactions for a single memory line, thereby simplifying the design of the agents. If multiple memory read transactions are received for a single memory line, the memory controller agents will configure themselves into a linked list to queue up the requests.

One of the advantages provided by the present invention is that the coherency information and memory line data associated with each memory line may be cached by each agent, thereby allowing repeated requests to the same memory line to be serviced more quickly. When two or more agents are queued up to fulfill multiple memory read transactions to the same memory line, the agents cooperate by transferring the coherency information and memory line data associated with each memory line from agent to agent, thereby minimizing the need to access main memory.

Memory transactions are completed by the outgoing memory transaction completion unit, which receives the outgoing transactions from the agents and relays the transactions back to the cacheable entities via the interconnection fabric.

The present invention provides many advantages over prior art memory controllers. Because each agent caches a memory line, the present invention correctly, transparently, and efficiently handles read-after-write conflicts to the same memory line. In many prior art memory controllers, if a read transaction attempts to access the same memory line as a pending write transaction, the read transaction is stalled until the write transaction has been completed, which is inefficient. Alternatively, other prior art memory controllers maintain special write queue registers and attempt to service the read operation out-of-order, which adds significant complexity to the design of the memory controller.

The present invention also handles multiple read memory transactions to the same memory line in a fair and deterministic order. Several linked lists may be created and advanced simultaneously. By creating linked lists, the agents allow unrelated memory traffic to proceed using free agents while read-after-read conflicts to the same memory line are queued up by linking other agents together.

The memory controller agents of the present invention adapt dynamically in response to ever changing memory traffic patterns. If memory transactions are repeatedly made to the same memory lines, the agents group together to form linked lists to service these transactions, and will cooperate by exchanging cached data to minimize the need to access main memory. This is especially useful if several cacheable entities repeatedly contend for the same memory line, as is common in semaphore operations. On the other hand, if memory transactions are made to many individual memory lines, the agents will operate independently from each other and service the transactions in parallel.

Compared to prior art memory controllers capable of handling comparable volumes of memory traffic, the memory controller of the present invention is significantly easier to design and verify, thereby minimizing development costs and minimizing time to market.

DETAILED DESCRIPTION OF THE PREFERRED EMBODIMENTS

The present invention is a memory controller having separate memory controller agents that process memory transactions in parallel. Designers of prior art memory controllers have tended to view memory coherency and scheduling as centralized, but separate problems. The present invention changes this paradigm by first assigning incoming memory transactions to a memory controller agent based on the memory line referenced in the transaction. Each memory controller agent is, in essence, a separate memory and coherency controller. However, each agent is only responsible for the coherency and scheduling of a single memory line, thereby greatly simplifying the design of each memory controller agent. By implementing a memory controller as a plurality of distributed memory controller agents, the present invention provides many other benefits, which will be described in greater detail below.

Figure 1:
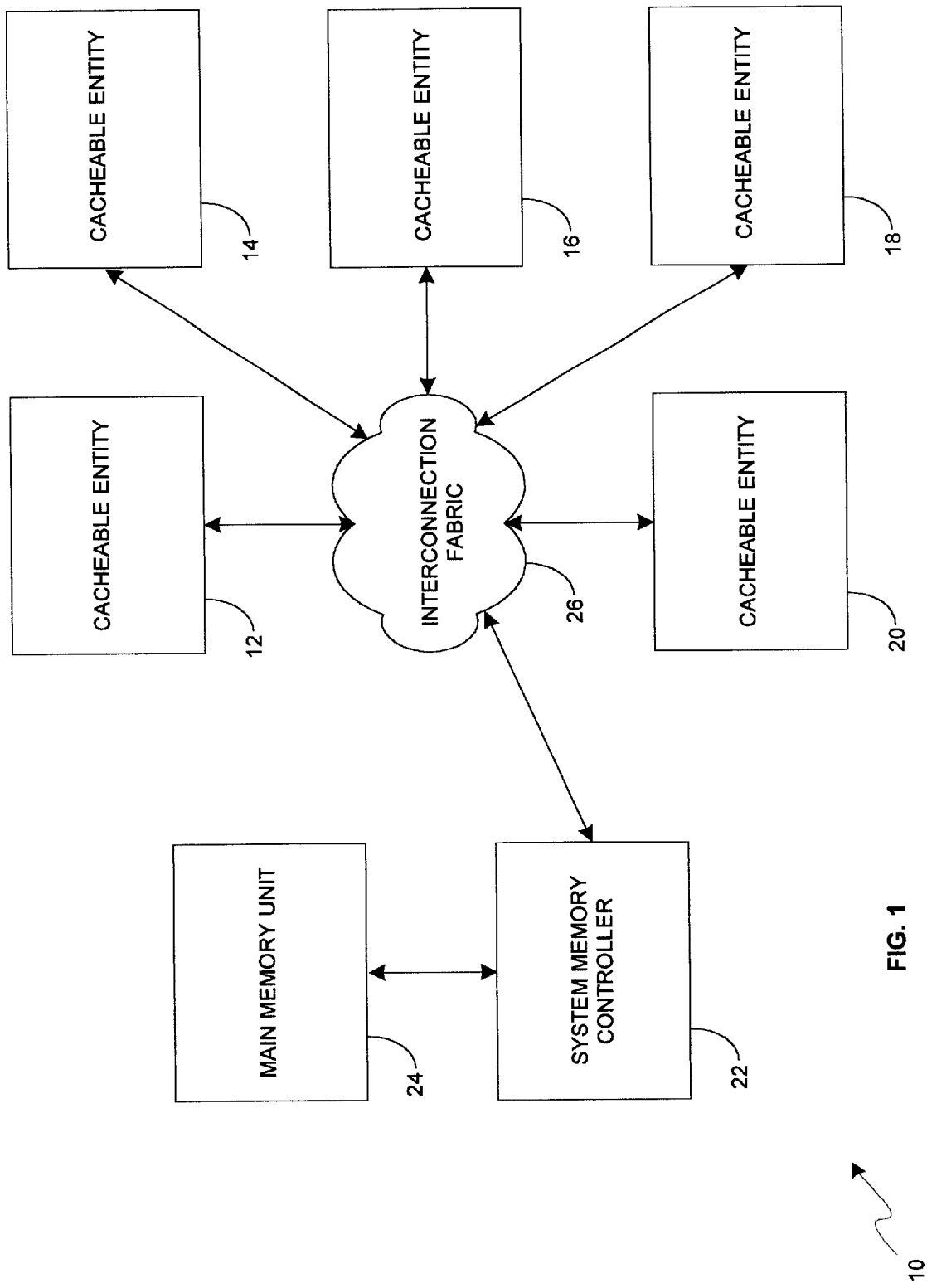
FIG. 1 is a block diagram of a computer system illustrating a system configuration in which a system memory controller in accordance with the present invention may be advantageously utilized.

FIG. 1 is a block diagram of a computer system 10, and illustrates a system configuration in which the system memory controller of the present invention may be advantageously utilized. FIG. 1 is merely representative, and those skilled in the art will recognize that the present invention may be employed in many other configurations. Computer system 10 includes cacheable entities 12, 14, 16, 18, and 20 and system memory controller 22, which are coupled to each other by interconnection fabric 26. Computer system 10 also includes main memory unit 24, which is coupled to system memory controller 22.

The cacheable entities may each comprise a variety of different subsystems. For example, a cacheable entity may comprise a single processor, a group of processors, a single I/O unit, a group of I/O units, or even a separate computer system coupled to a network and configured to share memory with other computer systems coupled to the network.

Note that each cacheable entity may include multiple cache memories, and each cacheable entity is responsible for providing coherency and memory control for its own cache memories. For example, assume that cacheable entity 14 comprises four processors that share a common bus. Further assume that the first processor seeks private ownership of a memory line stored in main memory unit 24. The first processor submits a private read transaction to a memory controller within entity 14, which in turn transmits the private read transaction to system memory controller 22 via interconnection fabric 26. System memory controller 22 grants the request, and provides the memory line to cacheable entity 14.

System memory controller 22 requires no special knowledge of the coherency mechanisms of cacheable entity 14. System memory controller 22 need only know that entity 14 has the memory line. Within cacheable entity 14, any type of cache coherency mechanism may be used, such as the snoop-based method or the directory-based method. Accordingly, when system memory controller 22 must recall the privately held memory line from cacheable entity 14, controller 22 submits the recall request to entity 14. In turn, the memory controller within entity 14 requests that any and all cache memories that have a copy of the memory line relinquish the copy so that the recall request can be completed to system memory controller 22.

In a system configuration such as that illustrated in FIG. 1, interconnection fabric 26 will typically be implemented using a fairly sophisticated interconnection technique, such as a ring, crossbar, or packet-based network. However, fabric 26 will generally not be implemented as a common bus. Therefore, coherency transactions between system memory controller 22 and one of the cacheable entities cannot be snooped by the other cacheable entities. Accordingly, a directory-based coherency mechanism is used to provide coherency.

To support the directory-based coherency mechanism, main memory unit 24 includes a directory that stores coherency-related status bits for each line of memory. These status bits include bits that identify the cacheable entity or entities that have a copy of the memory line, bits that indicate whether the line is being held as private or shared, and other status bits. The basic functionality of directory-based coherency mechanisms is well known in the art and need not be recited in detail herein to appreciate the present invention.

Figure 2:
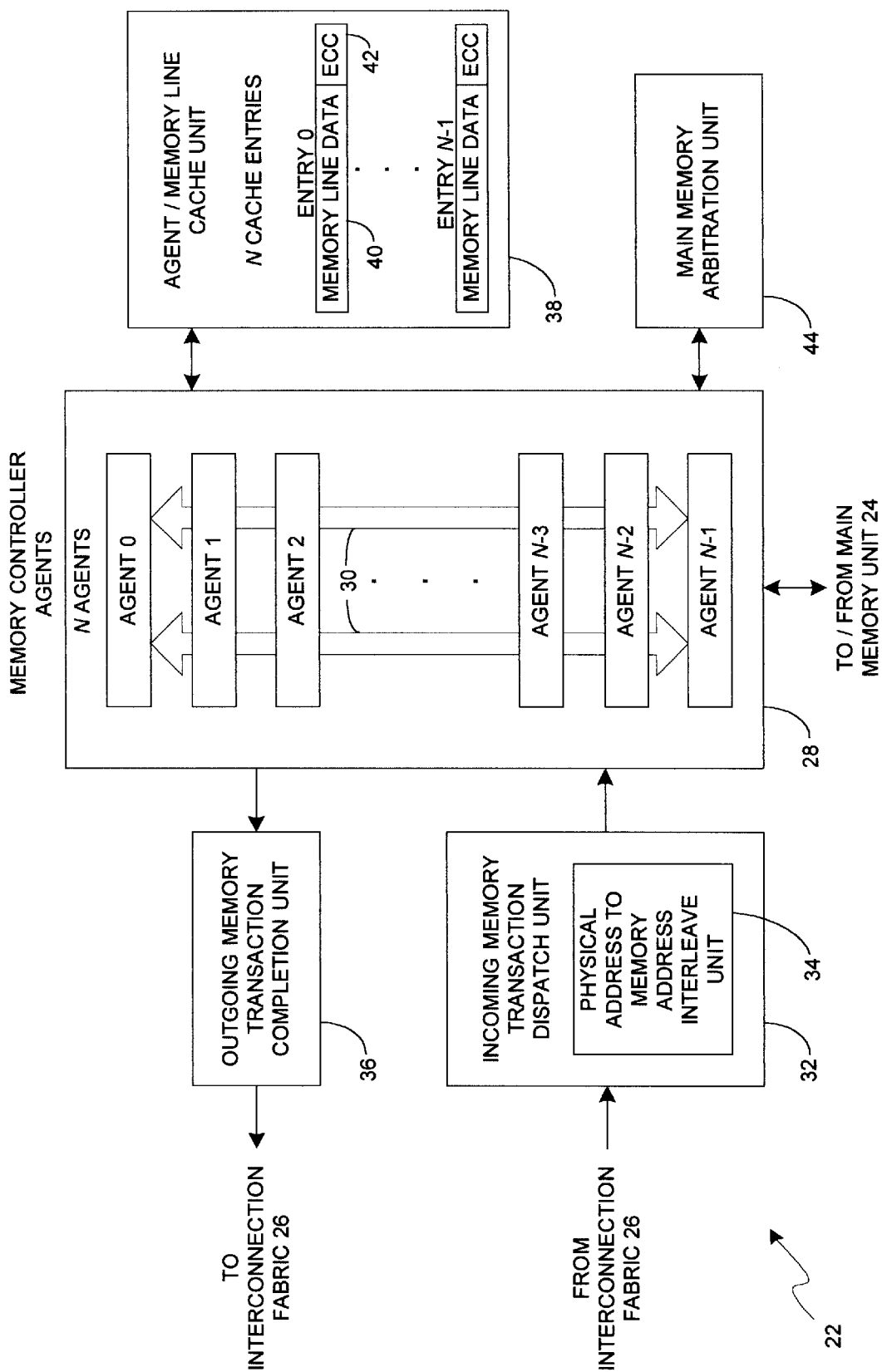
FIG. 2 is a block diagram of the system memory controller of FIG. 1, and includes a plurality of memory controller agents, an incoming memory transaction dispatch unit, which includes a physical address to memory address interleave unit, an outgoing memory dispatch unit, an agent/memory line cache unit, and a main memory arbitration unit.

FIG. 2 is a block diagram of memory controller 22, in accordance with the present invention. Memory controller 22 comprises memory controller agents 28, which are coupled to each other via busses 30, incoming memory transaction dispatch unit 32, which includes physical address to memory address interleave unit 34, outgoing memory dispatch unit 36, agent/memory line cache unit 38, and main memory arbitration unit 44. Note that the arrows showing data flow between agents 28 and units 24, 32, 36, 38, and 44 may be implemented as connections to busses 30.

Memory transactions are received from the cacheable entities shown in FIG. 1 at incoming memory transaction dispatch unit 32 via interconnection fabric 26. Incoming memory transaction dispatch unit includes physical address to memory address interleave unit 34. Unit 34 translates the physical address provided by the cacheable entity into a memory address that specifies the rank, bank, row, and column bits that are used to address the memory devices of main memory unit 24. Unit 34 also interleaves the memory addresses to optimize memory bandwidth. A variety of interleaving schemes are discussed in U.S. patent application Ser. No. 08/962,490 (U.S. Pat. No. 6,108,745) by Anurag Gupta, et al., which is entitled "A Fast and Compact Address Bit Routing Scheme That Supports Various Dram Bank Sizes and Multiple Interleaving Schemes", was filed on Oct. 31, 1997, is assigned to the same assignee as the present application, and is hereby incorporated by reference.

After unit 34 translates the physical address to a memory address, unit 32 presents the incoming memory transactions to agents 28. As will be seen below, each agent is responsible for ensuring coherency and fulfilling memory transactions for a single memory line. If multiple read requests are received for a single memory line, agents 28 may be configured into linked lists to queue up the requests.

One of the advantages provided by the present invention is that the coherency information and memory line data associated with each memory line may be cached by each agent, thereby allowing repeated requests to the same memory line to be serviced more quickly. As will be discussed in greater detail below, the coherency information is stored within each agent. However, the data from each memory line is stored in agent/memory line cache unit 38. When two or more agents are queued up to fulfill multiple read requests to the same memory line, it is only necessary to transfer between agents a cache index that identifies the cache entry.

Agent/memory line cache unit 36 includes N entries. Each entry includes a memory line data field 40 capable of storing the contents of a memory line, and an ECC entry 42 capable of storing an error correcting code that protects the integrity of the contents of field 40. At any given time, each agent will be uniquely associated with a cache entry. However, the associations between cache entries and agents will change as memory transactions are processed, thereby allowing several agents that are queued up to access the same memory line to reference the same entry of cache unit 36.

Main memory arbitration unit 44 prevents two agents from accessing the same memory bank at the same time. As discussed above, a physical address is converted to an interleaved memory address comprising rank, bank, row, and column bits by physical address to memory address interleave unit 34. When a particular agent attempts to access a particular memory address, that agent first accesses main memory arbitration unit 44 to determine whether the memory address can be accessed. If the address cannot be accessed because another agent is accessing the same memory bank, the agent must wait until unit 44 indicates that the agent can access that bank. Once the agent receives permission to access the memory address, the agent communicates directly with main memory unit 24. Note that by using appropriate interleaving strategies within unit 34, the chances of two agents attempting to access the same bank at the same time can be minimized.

Memory transactions are completed by outgoing memory transaction completion unit 36, which receives the outgoing transactions from the agents 28 and relays the transactions to interconnection fabric 26. Having introduced the functional blocks of memory controller 22 in FIG. 2, a complete understanding of the present invention may be achieved by considering one of the agents 28 in FIG. 3 and several examples in FIGS. 4–12 below.

Figure 3:
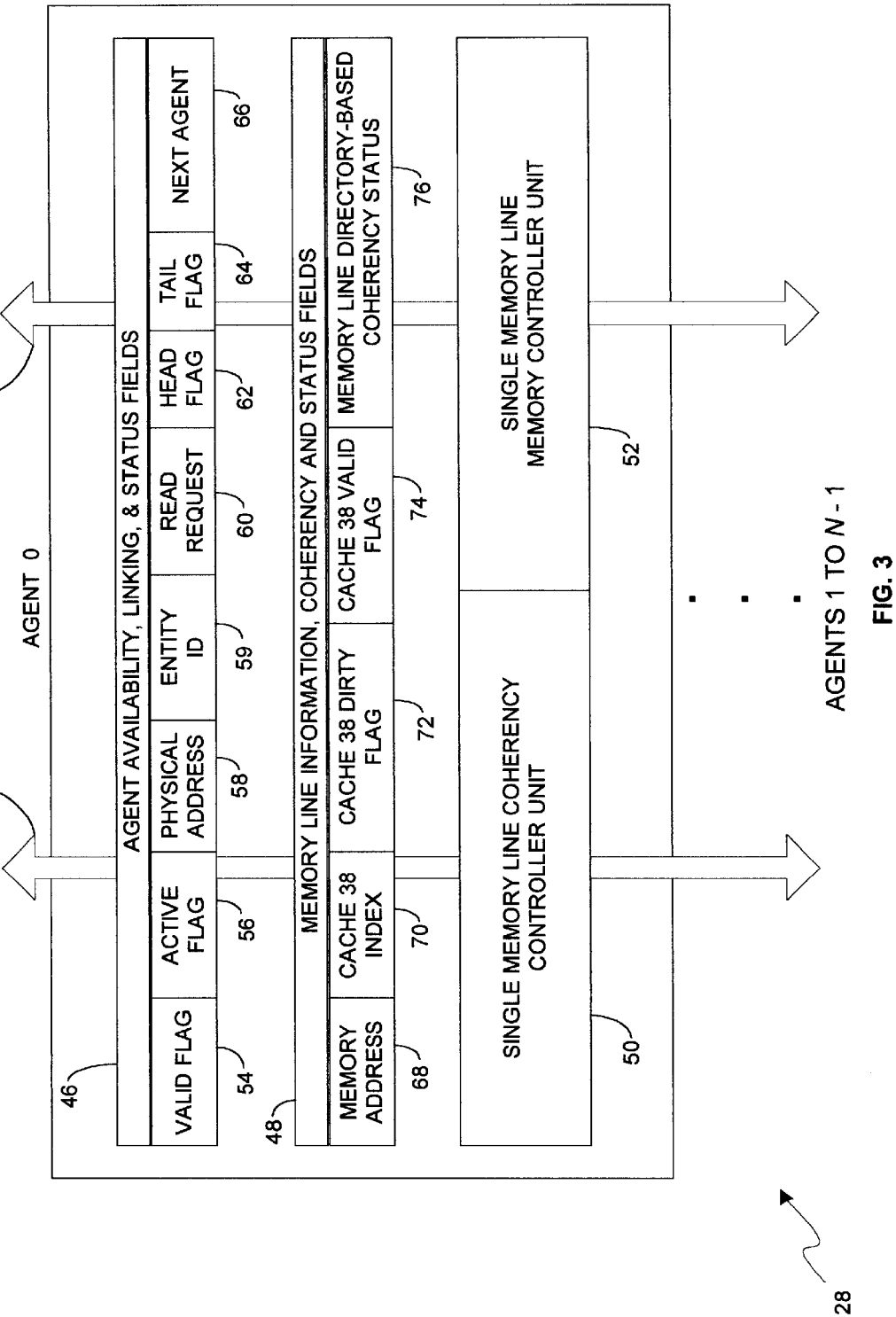
FIG. 3 is a block diagram showing one of the memory controller agents of FIG. 2 in greater detail.

FIG. 3 is a block diagram showing agent 0 of memory controller agents 28 of FIG. 2. The remaining N–1 agents are substantially similar, and although not shown in FIG. 3, are conceptually positioned beneath agent 0 and are coupled to busses 30. Note that one implementing the present invention may choose to have any number of agents. The number chosen will typically be based on a tradeoff between the amount of logic consumed by the agents and the desired bandwidth of the memory system. In one embodiment, 28 agents are used in a memory controller capable of supporting between 16 and 64 cacheable entities.

Agent 0 comprises agent availability, linking, and status fields 46, memory line information, coherency, and status fields 48, single memory.line coherency controller unit 50, and single memory line memory controller unit 52. Agent availability, linking, and status fields 46 include valid flag 54, active flag 56, physical address field 58, entity ID field 59, read request field 60, head flag 62, tail flag 64, and next agent field 66. Memory line information, coherency, and status fields 48 include memory address field 68, cache 38 index field 70, cache 38 dirty flag 72, cache 38 valid flag 74, and memory line directory-based coherency status field 76.

Valid flag 54 indicates whether any of the information in agent 0 is valid. When valid flag 54 is clear, agent 0 can accept a new memory transaction. With one exception, all other fields of agent 0 are "don't cares" when valid flag 54 is clear. The one exception is cache 38 index field 70. As mentioned above, each agent is uniquely assigned to a cache entry of agent memory line cache unit 38 at all times. Accordingly, when system memory controller 22 is initialized, initial assignments between the agents and cache entries are created. For example, field 70 of agent 0 is initialized to refer to cache entry 0, field 70 of agent 1 is initialized to refer to cache entry 1, and so on. As memory transactions are processed, agents may swap cache indexes, as will be discussed below. However, each agent will always be uniquely assigned to a cache entry, and therefore, the cache index held in cache 38 index field 70 must always be valid. Note that this mechanism provides an extremely efficient cache organization because cache unit 38 is never searched. The proper entry of cache unit 38 is always known based on the cache index held in cache 38 index field 70.

Active flag 56 indicates whether agent 0 is processing a memory transaction. Active flag 56 and valid field 54 are both used when searching for an available agent capable of receiving an incoming memory transaction. When an agent is initially assigned a memory transaction, both valid flag 54 and active flag 56 are set. After all pending transactions for a memory line are completed, active flag 56 is cleared, but valid flag 56 remains set. Thereafter, the agent continues to store, as long as practical, all information associated with the memory line, such as a cache index in cache 38 index field 70 that references valid memory line contents in cache unit 38, and directory-based coherency status for the memory line in field 76. If a subsequent incoming memory transaction that accesses the same memory line arrives at controller 22, that transaction can be processed more quickly because the agent already has all the information related to the memory line cached. In essence, each agent is capable of also being a cache memory that caches all information related to the memory line. When the valid flag is set and the active flag is clear, read request field 60, head flag 62, tail flag 64, and next agent field 66 are "don't cares" and the other fields are valid.

Accordingly, as will be discussed in greater detail below, an incoming memory transaction is assigned to an agent based on the following hierarchy. First, the physical address contained in the incoming memory transaction is compared to the physical address contained in physical address field 58. Assume that a match is found and the matching agent (or linked agents) have both the valid and active flags set. In this situation, a memory transaction for the memory line is in progress. An incoming write transaction will be processed immediately, and an incoming read transaction will be assigned a free agent and linked to another agent, as discussed below.

Second, assume that an address match is found and the matching agent has a set valid flag and a clear active flag. In this situation, there are no transactions in progress for the memory line. However, the matching agent has all information concerning the memory line cached. By assigning the incoming transaction to the matching agent, the transaction can be processed more quickly. As will be seen below, only one agent will produce a match in this situation. If multiple agents are linked together to queue up read transactions to the memory line, as each agent finishes, it will clear its valid flag, with the exception of the last agent to perform a transaction on the memory line. This last agent will leave its valid flag set, but clear its active flag.

Third, assume that no address matches are found. In this situation, the incoming memory transaction will be assigned to an agent that has its valid flag clear, if such an agent is available. And finally, if no agents have a clear valid flag, then the incoming transaction will be assigned to an agent that has a set valid flag and a clear active flag, but does not match the address of the memory transaction. Note that this agent is currently caching a different memory line, and assigning the incoming transaction to this agent will eliminate the opportunity to later achieve a "cache hit" for the memory line currently being cached. Accordingly, if there are several agents in this category, a mechanism is needed to select the proper agent. On mechanism known in the art is the "least recently used" (LRU) algorithm, which can be implemented using counters or time stamps. Of course, other cache replacement algorithms are known in the art and my be used with the present invention. If all agents are being used to process memory transactions, and no agents match any of the conditions discussed above, then incoming memory transaction dispatch unit 32 of FIG. 2 must hold the incoming memory transaction until an agent becomes available.

Physical address field 58 stores the physical address associated with an incoming memory transaction. As discussed above, this field is used to match an incoming transaction to an agent.

Entity ID field 59 stores the entity ID of the cacheable entity that submitted the incoming memory transaction. For the purposes of illustrating the present invention, assume that the entity ID of cacheable entity 12 of FIG. 1 is "0", the entity ID of cacheable entity 14 is "1", the entity ID of cacheable entity 16 is "2", and so on. Read request field 60 stores the type of read operation, such as "private" or "shared".

Head flag 62, tail flag 64, and next agent field 66 are used to link agents into a linked list to queue up multiple read requests to the same memory line. Head flag 62 is set if the agent is at the "top" of the list and is currently processing a request. Tail flag 64 is set if the agent is the last agent in the list, and next agent field 66 points to the next agent in the list. If the list only comprises a single agent, both the head and tail flags will be set and the next agent field will be a "don't care". Head flag 62, tail flag 64, and next agent field 66 will be described in greater detail in the examples below.

Memory address field 68 holds the memory address corresponding to the physical address contained in the memory transaction. The memory address is generated by physical address to memory address interleave unit 42 of incoming memory transaction dispatch unit 32, and comprises rank, bank, row, and column bits, as discussed above.

Cache 38 index field 70 stores an index to one of the entries of agent/memory line cache unit 38 of FIG. 2. As discussed above, at any time each agent is assigned to a unique cache entry.

Cache 38 dirty flag 72 indicates whether the contents of the cache entry indexed by field 70 have been altered. If the contents have not been altered, then the contents do not need to be written back to main memory unit 24. However, if the contents have been altered, then the contents must be written back to main memory unit 24 at some point to keep the main memory coherent. However, note that it is permissible to have multiple write transaction alter the cached memory contents before the contents are written back to main memory.

Cache 38 valid flag 74 indicates whether the contents of the cache entry indexed by field 70 are valid. For example, assume that a read transaction has been assigned to an agent having valid flag 54 clear. To process the transaction, single memory line memory controller unit 52 must retrieve the memory line and related directory information from main memory unit 24. When the memory contents are stored in an entry of cache unit 38, cache 38 valid flag 74 will be set.

Memory line directory-based coherency status field 76 stores coherency information for the memory line, such as memory line ownership and whether the line is being held as private or shared. Similar to cache 38 valid flag 74 and cache 38 dirty flag 72, field 76 also includes a valid flag to indicate whether the coherency information is valid and a dirty flag that indicates whether the coherency information needs to be written back to main memory unit 24.

Figure 4:
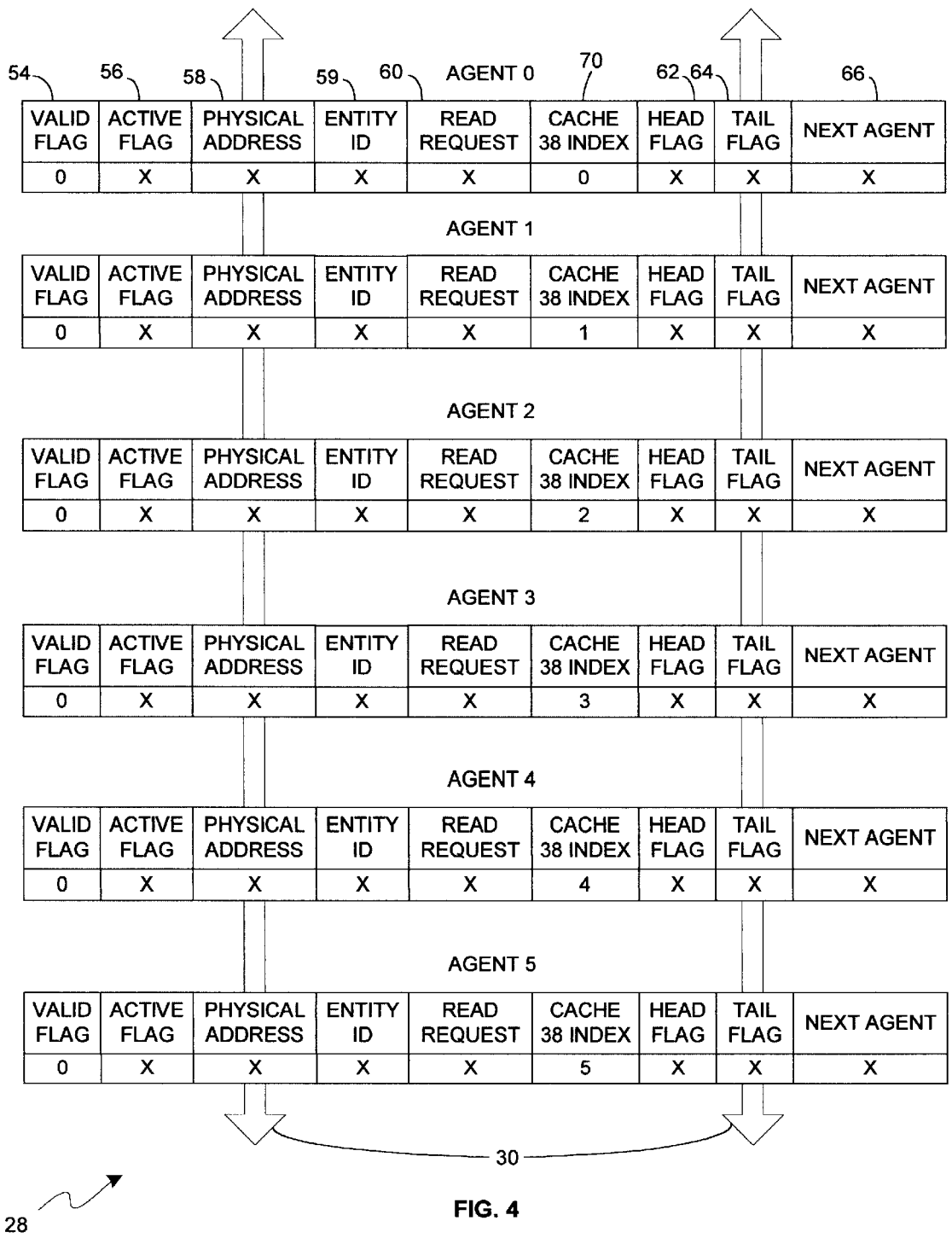
FIGS. 4–12 show an embodiment of the system memory controller of FIG. 2 having six memory controller agents, with each Figure illustrating a stage of the agents' response to a variety of memory transactions.

Having discussed the fields and associated functions of agent 0 with reference to FIG. 3. Several example will be presented below to illustrate how the present invention processes memory transactions. FIG. 4 shows an embodiment of system memory controller 22 having six agents 28. One implementing the present invention may chose to have additional agents. Only a subset of the fields are shown. This subset includes valid flag 54, active flag 56, physical address field 58, entity ID field 59, read request field 60, cache 38 index 70, head flag 62, tail flag 64, and next agent field 66.

In FIG. 4, assume that computer system 10 of FIG. 1 has just been initialized, and no memory transactions have been received. Accordingly, the valid flag 54 of each agent is clear. Furthermore, an initial association between each agent and each cache entry of agent/memory line cache unit 38 has been created, as discussed above. Accordingly, agent 0 references cache entry 0, agent 1 references cache entry 1, and so one. As discussed above, when valid flag 54 is clear, cache 38 index field 70 is the only valid field in the agent.

In the example below, assume that the following memory transactions are received by system memory controller 22 in the order listed:

1: Read Shared Line A From Cacheable Entity 0
2: Read Shared Line B From Cacheable Entity 1
3: Read Shared Line A From Cacheable Entity 2
4: Read Private Line A From Cacheable Entity 3
5: Read Private Line A From Cacheable Entity 4

Memory lines A and B simply refer to any valid memory line of main memory unit 24. Consider the first transaction. Incoming memory transaction unit 32 will receive the transaction, and physical address to memory address interleave unit 34 will convert the physical address for line A into a memory address for line A. Unit 32 will then broadcast the transaction to all agents 28 shown in FIG. 4. One of the agents will accept the transaction based on the hierarchy described above. Recall that the hierarchy scheme included several classes. These classes are described in greater detail below, with a matching agent from the lowest applicable class accepting the memory transaction.

Class 1 Agent or linked agents storing an address that matches memory transaction address, and valid and active flags are set, indicating that a memory transaction is in progress for the same memory line. Multiple agents may already be configured in a linked list to queue up memory read transactions to the same memory line. A write memory transaction is accepted by the matching agent having its head flag 62 set, and a read memory transaction is queued up by being accepted by a free agent from classes 3 or 4 below, and being linked to the matching entry having its tail flag 64 set. The previously free agent becomes the new tail agent in the linked list.

Class 2 Single agent storing address that matches transaction address, and valid flag is set and active flag is clear, indicating that no transaction is in progress for the same memory line, but matching agent has memory line information cached and accepts memory transaction.

Class 3 Agents having valid flags cleared. Lowest numbered agent in this class may accept memory transaction.

Class 4 Agents storing addresses that do not match transaction address, and valid flag is set and active flag is clear, indicating that agent is not active but is caching information for another memory line. An available agent is selected based on a replacement algorithm, such as the least recently used (LRU) algorithm.

Class 5 All agents busy, wait for a free agent in classes 3 or 4.

Returning to FIG. 4, at this point all valid flags 54 are clear, and hierarchy class 3 is the lowest numbered applicable class. Accordingly, agent 0 will accept memory transaction 1. Similarly, memory transaction 2 will not invoke hierarchy classes 1 and 2, so hierarchy class 3 will again be used and agent 1 will accept memory transaction 2. The result is shown in FIG. 5.

Figure 5:
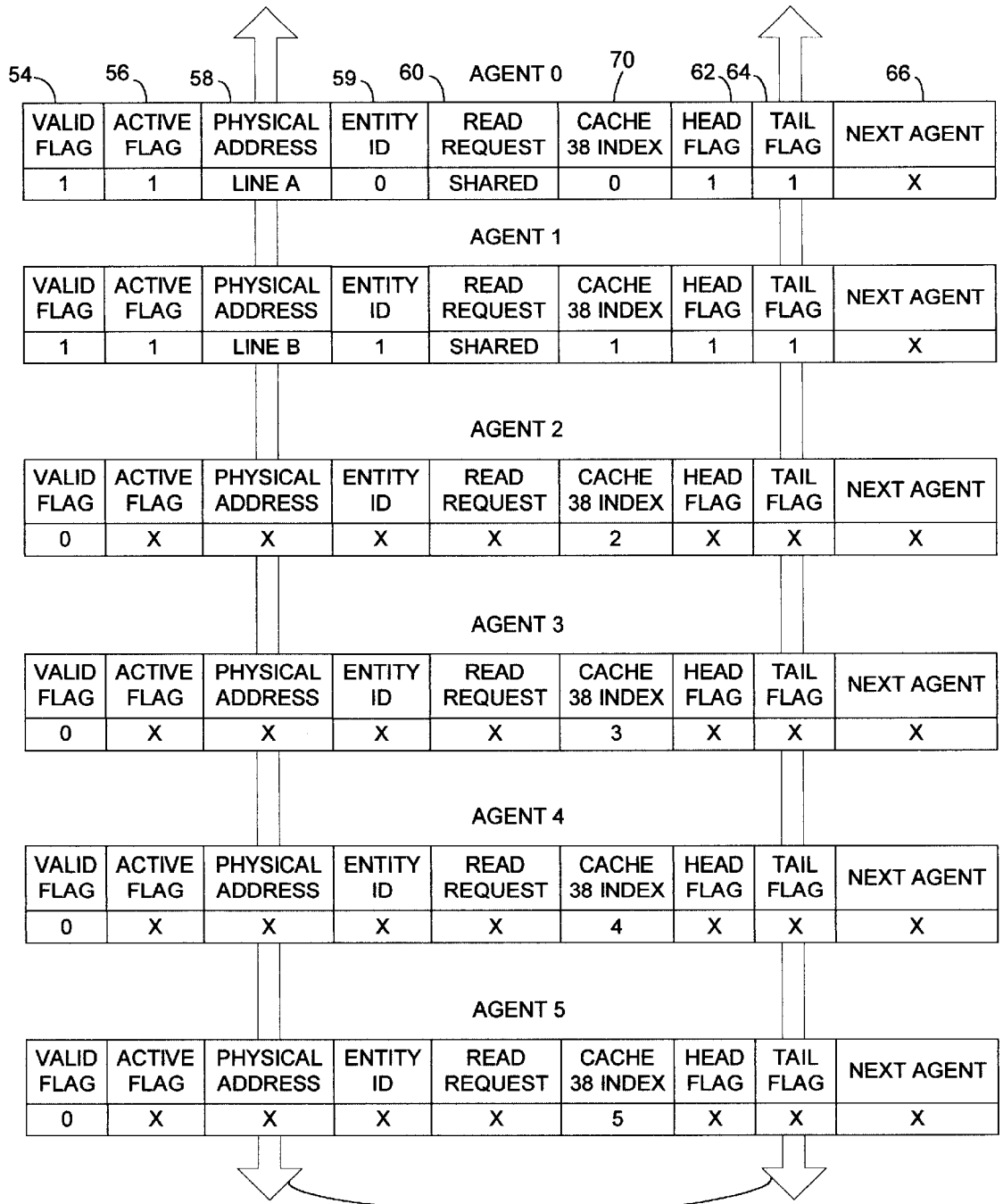

In FIG. 5, valid flag 54 and active flag 56 have each been set in agents 0 and 1. Furthermore, head flag 62 and tail flag 64 are set in agents 0 and 1 because each agent is now the head and tail entry of a linked list. The type of read request ("shared") has been entered in read request field 60 of agents 1 and 2, and physical address field 58 of agent 0 stores "line A" and field 58 of agent 1 stores "line B". Furthermore, entity ID field 59 of agent 0 stores entity ID "0" (which was contained in request 1) and field 59 of agent 1 stores entity ID "1" (which was contained in request 2).

As soon as agents 0 and 1 accept memory transactions 1 and 2, respectively, the single memory line memory controller unit 52 of each agent will access main memory arbitration unit 44 to seek permission to access main memory unit 24 using the memory address from memory address field 68 of FIG. 2. When permission is granted, each controller unit 52 will begin a read transaction to main memory unit 24. When the read transactions are complete, the memory line contents will be loaded into the cache entries of agent/memory line cache unit 38 referenced by the cache 38 index 70 of each agent. Also, the coherency information for each memory line will be stored in the memory line directory-based coherency status field 76 of each agent.

However, to illustrate other features of the present invention, assume that memory transactions 3, 4, and 5 are accepted by agents before the read transactions between controller unit 52 and main memory unit 24 are completed.

When memory transaction 3 is presented to agents 28, hierarchy class 1 will be invoked because the address contained in the transaction (line A) matches the address contained in physical address field 58 of agent 0, and the valid and active flags of agent 0 are set. Since this is a read transaction, agent 0 will drive lines on busses 30 requesting a free agent from hierarchy classes 3 and 4. Agent 0 will also clear its tail flag 64.

Agent 2 will accept the transaction because hierarchy class 3 will be invoked to provide the free agent. Agent 2 will accept the information from memory transaction 3, clear its head flag, set its tail flag, and drive its agent ID (which is "2") onto busses 30, Agent 0 will latch the agent ID of agent 2 in next agent field 66. The result is shown in FIG. 6.

Figure 6:
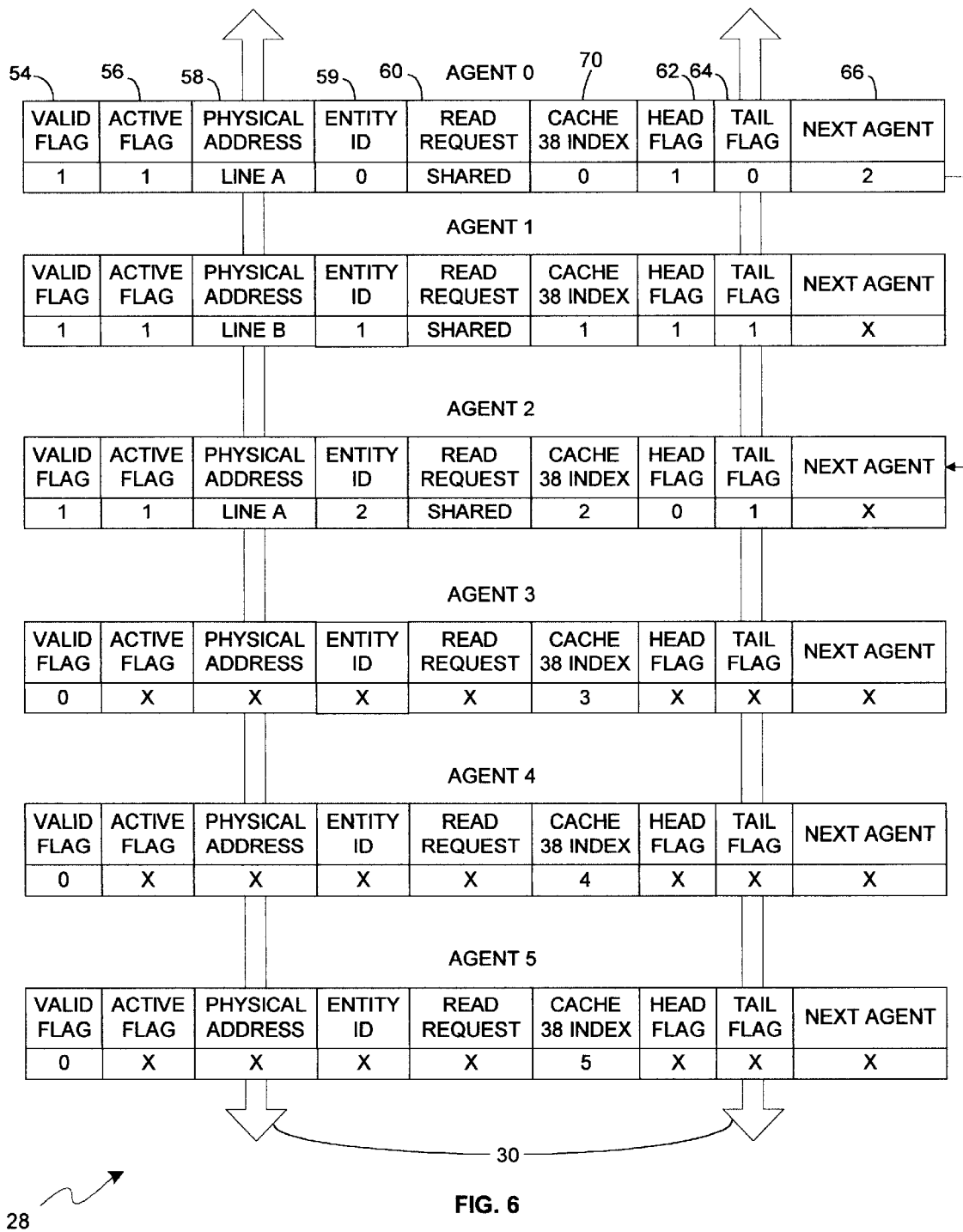

Before discussing FIG. 6, first note that the acceptance of transaction 3 by agent 2 required two steps. First, transaction 3 produced a hierarchy class 1 match with agent 0, and second, agent 0 requested a free agent from hierarchy classes 3 and 4, which resulted in agent 2 accepting transaction 3. This two step process may require several clock cycles. In an alternative embodiment, an agent from either hierarchy class 3 or 4 "steps forward" to accept the transaction as a free agent as soon as the transaction is presented to agents 28. If a match is also found at a higher hierarchy class, such as class 1 or 2 and the matching agent can accept the transaction, the matching agent signals the free agent from hierarchy class 3 or 4 to abandon its attempt to accept the transaction. In the example above, using this embodiment will result in agent 2 accepting the transaction at least one clock cycle sooner. However, no clock cycles are wasted if a matching agent at a higher hierarchy level signals the free agent to abandon its attempt to accept the transaction.

Returning to FIG. 6, note that agents 0 and 2 now form a linked list, with agent 0 at the head and agent 2 at the tail. Only the head agent is able to process a memory transaction. The other agents in the list are "asleep" and will be "awakened" when they reach the head position, as will be described below.

Figure 7:
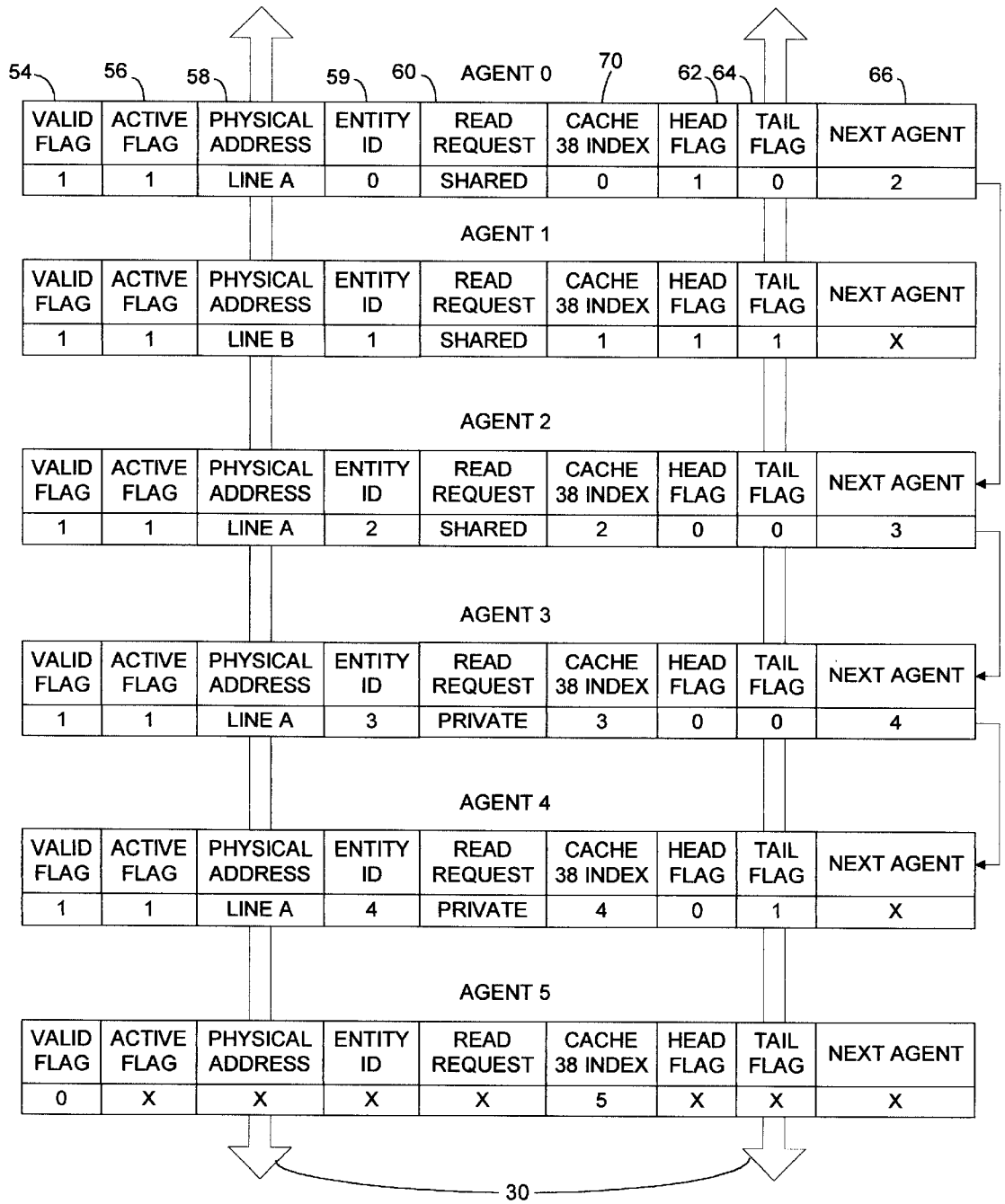

Now assume that memory transactions 4 and 5 are presented to agents 28. In a manner similar to that described above, agent 3 will accept memory transaction 4 and agent 2 will link to agent 3, and agent 4 will accept memory transaction 5 and agent 3 will link to agent 4. The result is shown in FIG. 7. Agents 0, 2, 3, and 4 are now arranged in a linked list. Note that agent 4 is at the tail of the list, so its tail flag is set and its head flag is clear. Agents 2 and 3 are in the middle of the list, so both agents have their head and tail flags clear. Agent 0 continues to be at the head of the list with its head flag set and its tail flag is clear.

Next, assume that the read transactions sent by the controller units 52 of agents 0 and 1 to main memory unit 24 complete. The single memory line coherency controller unit 50 of each agent will examine the coherency information stored in memory line directory-based coherency status field 76. In this case, the coherency information will reflect the fact that no other cacheable entity has a copy of the memory line, so each agent will complete its request to the proper cacheable entity via outgoing memory transaction unit 36 of FIG. 2.

Since agent 1 is both the head and tail of a linked list, after completing the memory transaction agent 1 will clear its active flag 56. Note that cacheable entity 1 now has a shared copy of memory line B. This information is reflected in memory line directory-based coherence status field 76, but has not yet been written to back to main memory unit 24. Agent 1 may defer writing the information back to main memory unit 24 until agent 1 accepts a new transaction as a hierarchy class 4 free agent. It is possible that agent 1 may accept several memory transactions in hierarchy class 2 before it becomes necessary to update main memory unit 24. Accordingly, this approach conserves memory bandwidth. However, preferably agent 1 will issue a low priority write transaction to main memory unit 24. The low priority write transaction can be deferred by main memory arbitration unit 44 until other higher priority transactions to the same bank are completed. By issuing the transaction as soon as practical in an open transaction slot, agent 1 can more quickly accept a new transaction as a hierarchy class 4 free agent.

Agent 0, however, is not the tail agent of its list, so agent 0 must advance the list. To advance the list, agent 0 first accesses next agent field 66 to determine that agent 2 is the next agent in the list. Agent 0 and agent 2 will swap cache indexes contained in cache 38 index field 70. Furthermore, agent 0 will drive the contents of cache 38 dirty flag 72, cache 38 valid flag 74, and memory line directory-based coherency status field 76 (all from FIG. 3) out via busses 30, and agent 2 will latch this information into its corresponding fields. Agent 2 will set its head flag 62, and agent 0 will clear its valid flag 54. The result is shown in FIG. 8.

Figure 8:
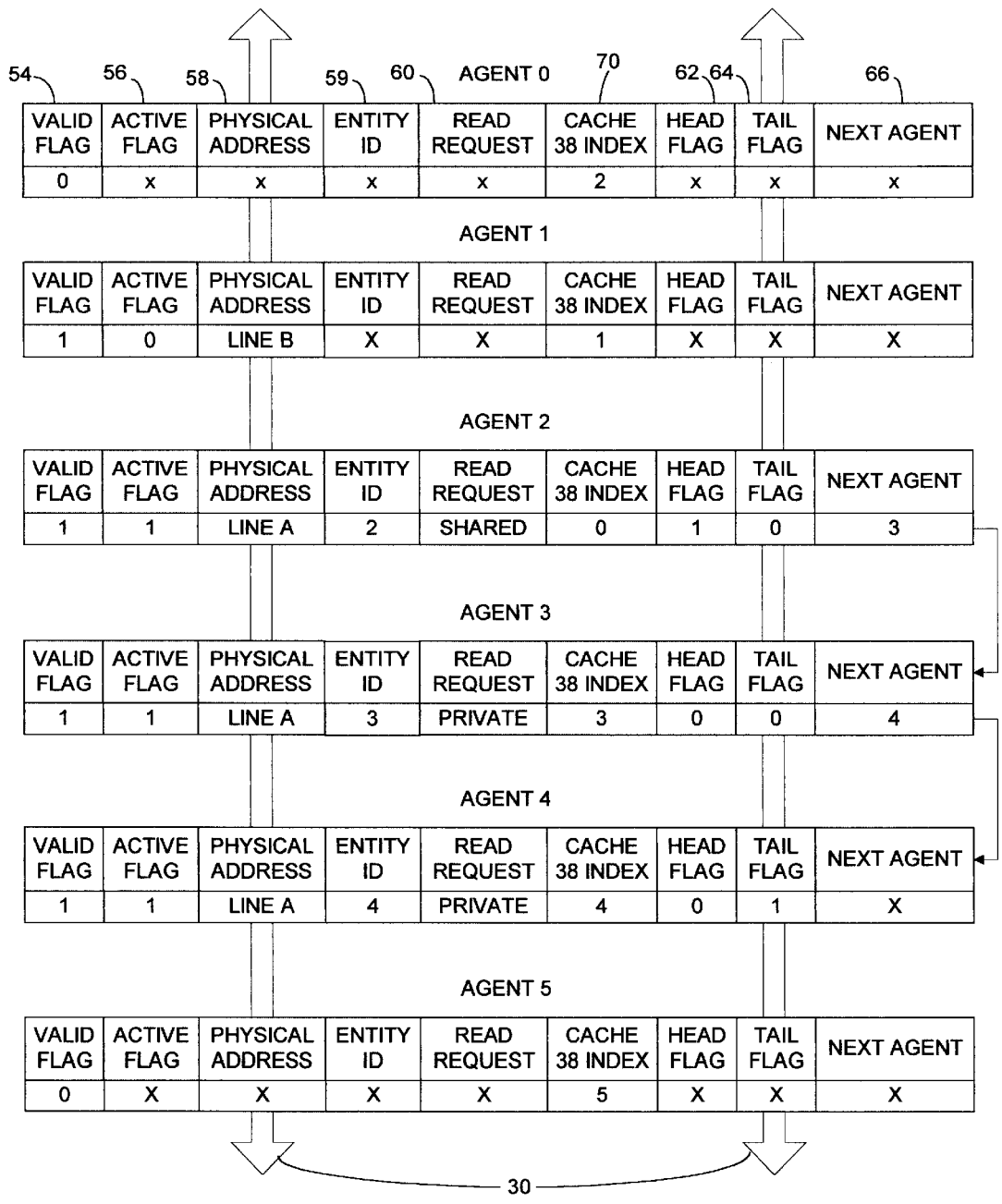

Before discussing FIG. 8, first consider an alternative embodiment wherein agent 2 gets a "head start" by snooping the transactions of agent 0. In this embodiment, as agent 0 is completing its request to the proper cacheable entity via outgoing memory transaction unit 36 of FIG. 2, agent 0 also drives the contents of its tail flag 64, next agent field 66, cache 38 index field 70, cache 38 dirty flag 72, cache 38 valid flag 74, and memory line directory-based coherency status field 76 onto busses 30. Agent 2 observes that it is the next agent identified in next agent field 66, and that tail flag 64 of agent 0 is clear, indicating that agent 0 is not the last agent in the linked list. Accordingly, agent 2 latches the information from cache 38 index field 70, cache 38 dirty flag 72, cache 38 valid flag 74, and memory line directory-based coherency status field 76 from agent 0. Agent 2 now has all the information required to complete transaction 3 without having to access main memory unit 24. Accordingly, agent 2 can complete transaction 3 one clock cycle after agent 0 completed transaction 1. While agent 2 is completing transaction 3, agent 2 can also transmit the old cache index previously held in its cache 38 index field 70 back to agent 0, thereby completing the exchange of the cache indexes.

Returning to FIG. 8, note that agent 0 can now accept a memory transaction as a free agent in hierarchy class 3. Also note that agent 1 will accept a memory transaction to "line B" in hierarchy class 2, with the contents and coherency information for "line B" being cached by agent 1. As long as free agents are available in hierarchy class 3, agent 1 will not need to accept a memory transaction as a free agent in hierarchy class 4, and can continue to hold the cached information for "line B".

Since agent 2 is now the head agent in the linked list for memory line A, agent 2 "awakens" and begins to process memory transaction 3. Since agent 2 now has access to cache entry of cache unit 38 that is indexed by index "0" (which holds the memory contents of line A) and the coherency information for line A, and this is a read shared request, agent 2 has all the information required to complete memory transaction 3 to cacheable entity 2 without having to access main memory unit 24.

Note that coherency controller unit 50 keeps track of the entities that have a copy of the memory line by using the coherency information in field 76 and main memory unit 24. One mechanism for doing this is to use a mask having a bit for each cacheable entity.

Figure 9:
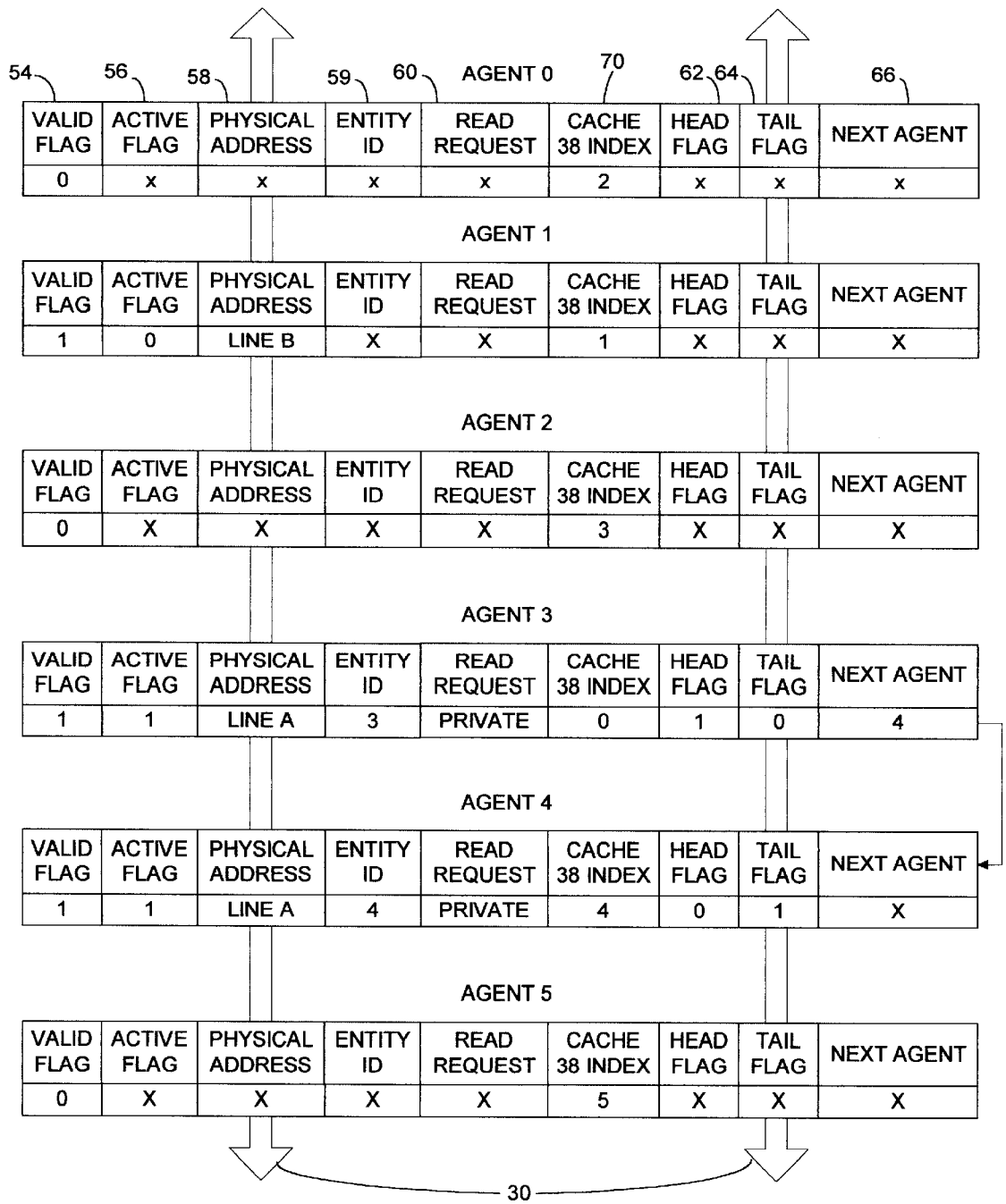

After agent 2 completes memory transaction 3, agent 2 advances the linked list. The result is shown in FIG. 9. In FIG. 9, agent 2 now has its valid flag clear and agent 3 "awakens". As above, agent 3 "inherits" all relevant information about line A from agent 2. Since memory transaction 4 requests private access to line A, single memory line coherency controller unit 50 issues recall request transactions to cacheable entities 0 and 1 via outgoing memory transaction completion unit 36 because entities 0 and 1 each hold a shared copy of line A. A recall acknowledgment transaction is then received from entity 0 and 1 at incoming memory transaction dispatch unit 32, and is transmitted back to agent 3 via busses 30. A recall acknowledgment transaction for a shared memory line does not contain data since shared lines, by definition, cannot be altered.

After the recall acknowledgment transactions are received, agent 3 completes the read request to cacheable entity 3 and advances the linked list to agent 4. Agent 4 now begins processing memory transaction 5, which is also a read request that seeks to gain private access to line A. Accordingly, controller unit 50 must issue a recall request transaction to cacheable entity 3, which currently holds the line as private. If entity 3 did not alter its copy of line A, then entity 3 can respond with a recall acknowledgment transaction, as described above. However, if entity 3 did alter its copy, then it must also include the altered data in the recall acknowledgment transaction. If this is the case, then agent 4 will store the altered data in entry 0 of cache unit 38, and cache 38 dirty flag 72 in FIG. 3 will be set.

Agent 4 then completes memory transaction 4 to cacheable entity 4, thereby giving entity 4 private access to line A. At this point, agent 4 has both head flag 62 and tail flag 64 set, and therefore is the last agent in the list. The contents and coherency information for line A have been altered. As discussed above, single memory line memory controller unit 52 can either issue a low priority write transaction to main memory unit 24 to update line A, or this can be deferred until agent 4 is needed as a hierarchy class 4 free agent. Agent 4 then clears its active flag, and the result is shown in FIG. 10.

Figure 10:
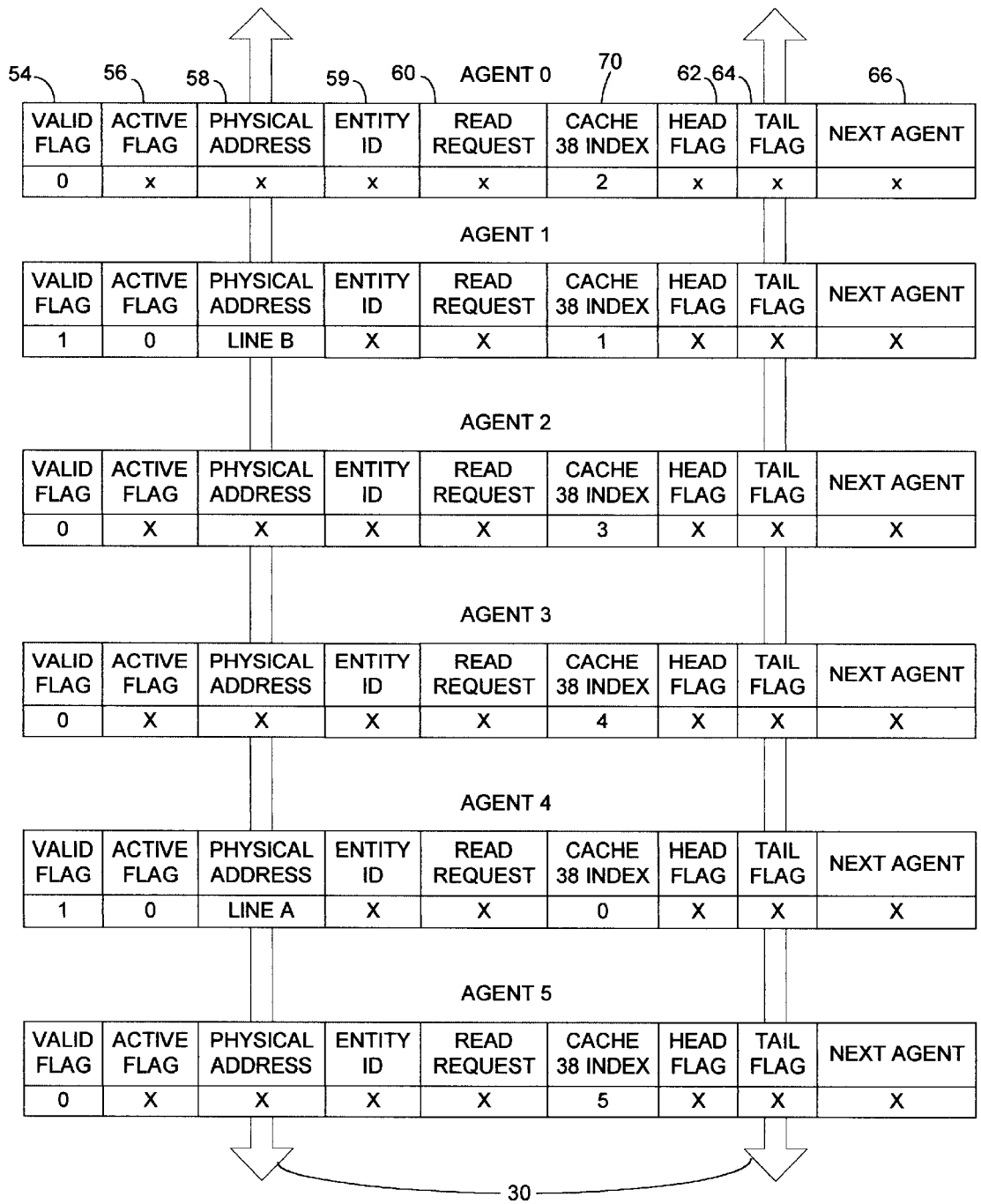

In FIG. 10, no transactions are pending. However, agent 1 is now caching information associated with line B and agent 4 is now caching information associated with line A. If a memory transaction for line A or B is received, agent 4 or 1, respectively, will accept the transaction in hierarchy class 2 and the transaction will be processed more efficiently with the cached data.

The example above was presented to illustrate several significant features of the present invention. First, note how often memory transactions were able to be satisfied using the data cached by the agents. The five memory transaction discussed above were serviced using only two read transactions from main memory unit 24 and two write transaction to unit 24. As discussed above, it is also possible to delay the write transactions, and thereby possibly eliminate them. Accordingly, the five memory transactions could be serviced using as few as two read transactions from unit 24. Most prior art memory controllers would require a read from main memory and a write to main memory for each memory transaction, thereby requiring ten transactions to main memory. Furthermore, a future incoming memory transaction to lines A or B will not require a read transaction to unit 24, since those lines are currently being cached by agents 4 and 1, respectively.

Second, note how efficiently the linked list in FIGS. 5–10 was created and advanced. The list need never be searched, and agents can be added to and removed from the list in one or two clock cycles. Also note that as the list is advanced, the data and coherency information for line A was seamlessly passed from agent to agent, with cache index "0" successively flowing from agent 0 to agents 2, 3, and 4.

Another significant advantage provided by the present invention occurs when system memory controller 22 receives a memory read transaction to a memory line immediately after a memory write transaction to the same memory line. In many prior art memory controllers, if a read transaction attempts to access the same memory line as a pending write transaction, the read transaction is stalled until the write transaction has been completed, which is inefficient. Alternatively, other prior art memory controllers maintain special write queue registers and attempt to service the read operation out-of-order, which adds significant complexity to the design of the memory controller.

Figure 11:
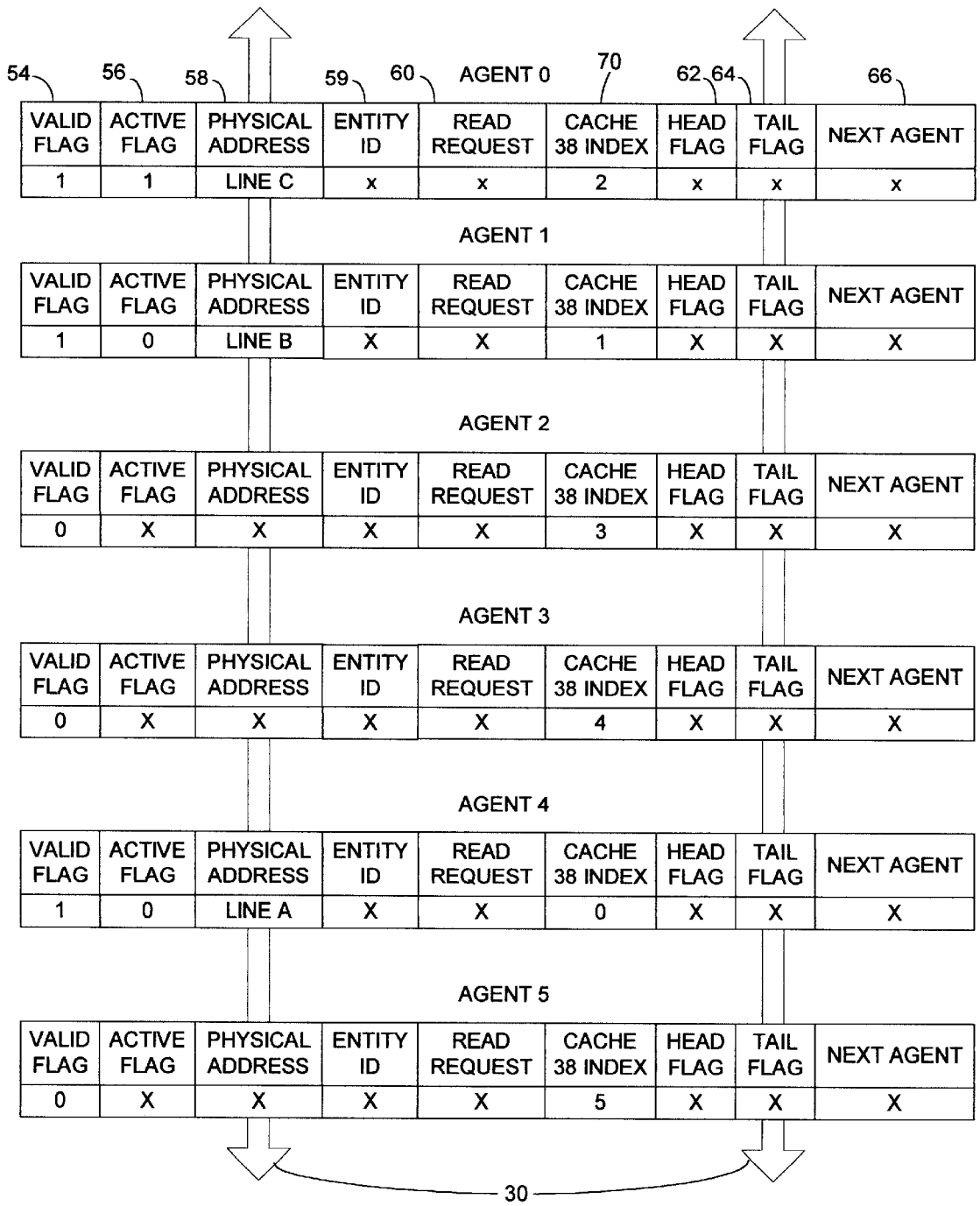

However, the architecture of the present invention inherently solves this problem. Consider an example wherein one of the cacheable entities in FIG. 1 must cast out a dirty cache line held as private for memory line C. The entity will issue a write memory transaction that will be accepted by one of the agents. Assume that agent 0 in FIG. 10 accepts this transaction. The result is shown in FIG. 11. Valid flag 54 and active flag 56 are set, the data for line C is stored in cache unit 38 at cache entry 2, the index for which is stored in cache 38 index field 70, and the coherency information stored in memory line directory-based coherency status field 76 is updated to reflect the fact that no entity has a copy of line C. Also, cache 38 dirty flag 72 and the dirty flag within field 76 are set, thereby causing single memory line memory controller unit 52 to write to main memory unit 24 to update memory line C. Note that the other fields of agent 0 shown in FIG. 11 are "don't cares".

Figure 12:
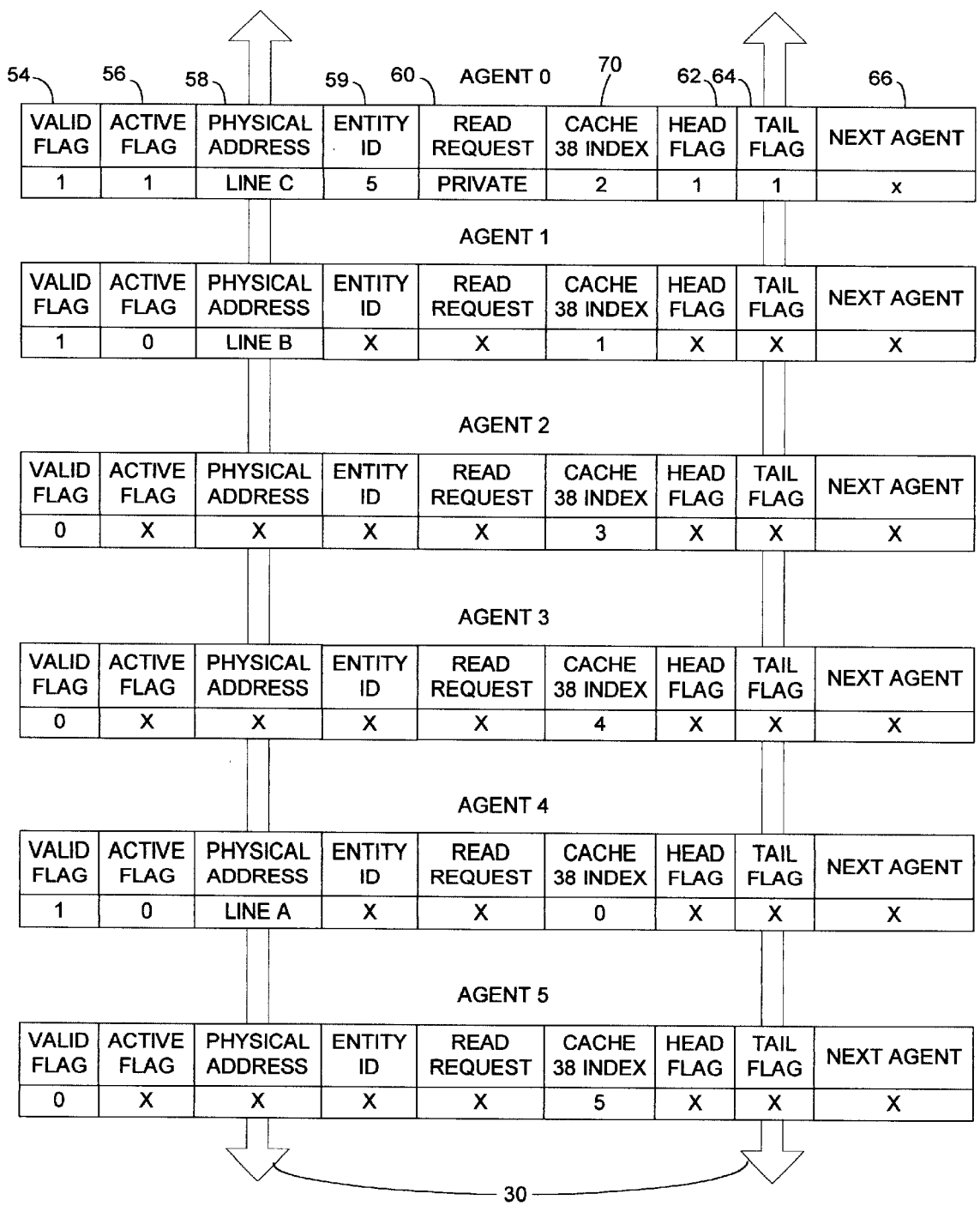

Now assume that cacheable entity 5 issues a memory read transaction for memory line C, and requests private ownership. The transaction will be accepted by agent 0 as a hierarchy class 1 match, and the result is shown in FIG. 12. Even though single memory line memory controller unit 52 is in the process of writing to main memory unit 24 to update memory line C, this write operation need not be completed to service the read private transaction from entity 5 because agent 0 has all the information required to respond to entity 5. As a matter of fact, controller unit 52 may cancel or otherwise ignore the write transaction to main memory unit 24, and will issue a new transaction to unit 24 to reflect the fact that entity 5 now has private ownership of memory line C. After the read private memory transaction is completed to entity 5, agent 0 will clear its active flag 56 but leave its valid flag 54 set to cache memory line C for as long as possible, as described above. Accordingly, the distributed nature of the agents along with the caching ability of the agents provide a dramatic improvement over prior art memory controllers when servicing read-after-write conflicts to the same memory line.

Another related advantage provided by the present invention relates to write-after-write conflicts to the same memory line. Consider a write operation that seeks to write data in sub-memory line increments. For example, if a memory line comprises 128 bytes, a sub-memory line write would be a write that only alters the lower 32 bytes of the memory line. Typically a processor will not perform a sub-memory line write, but an I/O unit may. In a typical prior art controller, the complete memory line must be read from main memory. Then, that portion of the memory line altered by the sub-memory line transaction must be updated, and the memory line must be written back to main memory. Successive sub-memory line write transactions to the same memory line must wait for earlier transactions to complete.

In the present invention, each successive sub-memory line write transaction will be accepted by the same agent as a hierarchy class 1 match. Accordingly, the sub-memory line write transactions will be coalesced into one memory line by the agent. The agent may successively issue and cancel updates to main memory unit 24, but this will not affect the rate at which the sub-memory line write transactions are processed.

As can be seen from the discussion above, the present invention provides many advantages over prior art memory controllers. The present invention correctly, transparently, and efficiently handles read-after-write conflicts to the same memory line, and provides data merging and coalescing for write-after-write conflicts and sub-memory line writes to the same memory line.

The present invention also handles multiple read memory transactions to the same memory line in a fair and deterministic order. In the relatively simple examples above, only a single linked list was created and advanced. However, in a memory controller in accordance with the present invention having many more agents, several linked lists may be created and advanced simultaneously. By creating linked lists, the distributed agents allow unrelated memory traffic to proceed using free agents while read-after-read conflicts to the same memory line are queued up by linking other agents together.

The memory controller agents of the present invention adapt dynamically in response to ever changing memory traffic patterns. If memory transactions are repeatedly made to the same memory lines, the agents group together to form linked lists to service these transactions, and will cooperate by exchanging cached data to minimize the need to access main memory. This is especially useful if several cacheable entities repeatedly contend for the same memory line, as is common in semaphore operations. On the other hand, if memory transactions are made to many individual memory lines, the agents will operate independently from each other and service the transactions in parallel.

While the manner in which the agents respond to memory traffic is collectively quite complex, each agent is relatively simple. Since each agent is only responsible for a single memory line, memory and coherency control is greatly simplified. Compared to prior art memory controllers capable of handling comparable volumes of memory traffic, the memory controller of the present invention is significantly easier to design and verify, thereby minimizing development costs and minimizing time to market.

Although the present invention has been described with reference to preferred embodiments, workers skilled in the art will recognize that changes may be made in form and detail without departing from the spirit and scope of the invention.

What is claimed is:

1. A number of hardware processing entities that cooperate to process access requests directed to a partitioned hardware resource controlled by the number of hardware processing entities, each cooperating hardware processing entity comprising:
    a coupling to a bus by which the hardware processing entity intercommunicates with other hardware processing entities, an access request dispatching entity, and the hardware resource;
    stored data that includes flags to indicate whether or not the hardware processing entity currently contains valid stored data related to a hardware-resource partition and whether or not the hardware processing entity is currently executing an access request, an identifier of the hardware-resource partition, an identifier that identifies the type of access request, a stored flag indicating whether or not the hardware processing entity occupies a head position within a linked list, a stored flag indicating whether or not the hardware processing entity occupies a tail position within a linked list, and a link identifying a next hardware processing entity within a linked list in which the hardware processing entity currently resides; and
    control logic that
        recognizes access requests broadcast to the bus,
        accepts access requests directed to a hardware-resource partition identified by the stored data, and
        executes those accepted access requests that the hardware processing entity identifies as directly executable, and, for those accepted access requests that the hardware processing entity identifies as not directly executable, recruits another hardware processing entity to execute the accepted access request, the other hardware processing entity cooperating with the hardware processing entity to link itself to a linked list associated with the hardware-resource partition.

2. The number of hardware processing entities of claim 1 wherein, by executing those access requests that the hardware processing entity identifies as directly executable, and by recruiting another hardware processing entity to execute those accepted access requests that the hardware processing entity identifies as not directly executable, the number of hardware processing entities cooperate to organize themselves on linked lists in orders that ensure a proper overall execution order for access requests directed to the hardware processing entities.

3. The number of hardware processing entities of claim 2 wherein the linked lists on which the number of hardware processing entities cooperate to organize themselves are never searched, and wherein a hardware processing entity adds itself to a linked list in order to execute an access request in two or less clock cycles.

4. The number of hardware processing entities of claim 1 wherein, when the hardware processing entity completes execution of an access request, the hardware processing entity removes itself from a linked list, promoting a next hardware processing entity on the linked list to a head position, and thus allowing the next hardware processing entity to execute a next access request for which the next hardware processing entity was recruited to execute.

5. The number of hardware processing entities of claim 4 wherein a hardware processing entity removes itself form a linked list following execution of an access request in two or less clock cycles.

6. A number of hardware processing entities that cooperate to process access requests directed to a partitioned hardware resource comprising memory line in a memory-line cache unit and a main memory controlled by the number of hardware processing entities, each partition corresponding to a memory line in the memory-line cache unit, the access requests comprising memory access requests directed to main memory through the memory-line cache unit each cooperating hardware processing entity comprising:
    a memory-controller agent;
    a coupling to a bus by which the memory-controller agent intercommunicates with other memory-controller agents, an access request dispatching entity, and the memory-line cache unit;
    stored data; and
    control logic that
        recognizes access requests broadcast to the bus,
        accepts access requests directed to a memory-line, identified by the stored data, in main memory through the memory-line cache unit, and
        executes those accepted access requests that the memory-controller agent identifies as directly executable, and, for those accepted access requests that the memory-controller agent identifies as not directly executable, recruits another memory-controller agent to execute the accepted access request, the other memory-controller agent cooperating with the memory-controller agent to link itself to a linked list associated with the memory-line.

7. The number of hardware processing entities of claim 6 wherein the stored data includes:
    a valid flag, indicating whether or not the hardware processing entity currently contains valid memory-line cache information for a memory line;

an active flag that indicates whether or not the hardware processing entity is currently executing an access request;

a physical memory address corresponding to an access request;

an entity ID that identifies the processor or processing-entity source of the an access request;

head and tail flags;

a next-agent identifier identifying a next memory-controller agent in a linked list; and a memory address corresponding to the physical memory address.

8. A method for controlling a partitioned hardware resource, the method comprising:

providing a number of hardware processing entities that cooperate to process access request directed to a partitioned hardware resource controlled by the number of hardware processing entities, each hardware processing entity comprising a coupling to the communications medium, stored data, and control logic that recognizes access requests broadcast to communications medium, accepts access requests directed to a hardware-resource partition identified by the stored data, and executes those accepted access requests that the hardware processing entity identifies as directly executable, and, for those accepted access requests that the hardware processing entity identifies as not directly executable, recruits another hardware processing entity to execute the accepted access request, the other hardware processing entity cooperating with the hardware processing entity to link itself to a linked list associated with the hardware-resource partition and, by executing those access requests that the hardware processing entity identifies as directly executable, and by recruiting another hardware processing entity to execute those accepted access requests that the hardware processing entity identifies as not directly executable, the number of hardware processing entities cooperate to organize themselves on linked lists in orders that ensure a proper overall execution order for access requests directed to the hardware processing entities; and coupling the number of hardware processing entities to a communications medium by which the hardware processing entities intercommunicate with one another other, with an access request dispatching entity, and with the hardware resource.

9. The method of claim 8 further including never searching the linked lists on which the number of hardware processing entities cooperate to organize themselves.

10. The method of claim 9 wherein a hardware processing entity adds itself to a linked list in order to execute an access request in two or less clock cycles.

11. The method of claim 8 wherein wherein, when a hardware processing entity completes execution of an access request, the hardware processing entity removes itself from a linked list, promoting a next hardware processing entity on the linked list to a head position, and thus allowing the next hardware processing entity to execute a next access request for which the next hardware processing entity was recruited to execute.

12. The method of claim 11 wherein a hardware processing entity removes itself from a linked list following execution of an access request in two or less clock cycles.

* * * * *